3,392,943
MOUNTING EAR MEANS FOR MOLDED
ELECTRICAL BOXES
William E. Baxter, Wood County, W. Va., assignor to
Union Insulating Company, Inc., Parkersburg, W. Va.,
a corporation of West Virginia
Filed Sept. 30, 1966, Ser. No. 583,225
11 Claims. (Cl. 248—27)

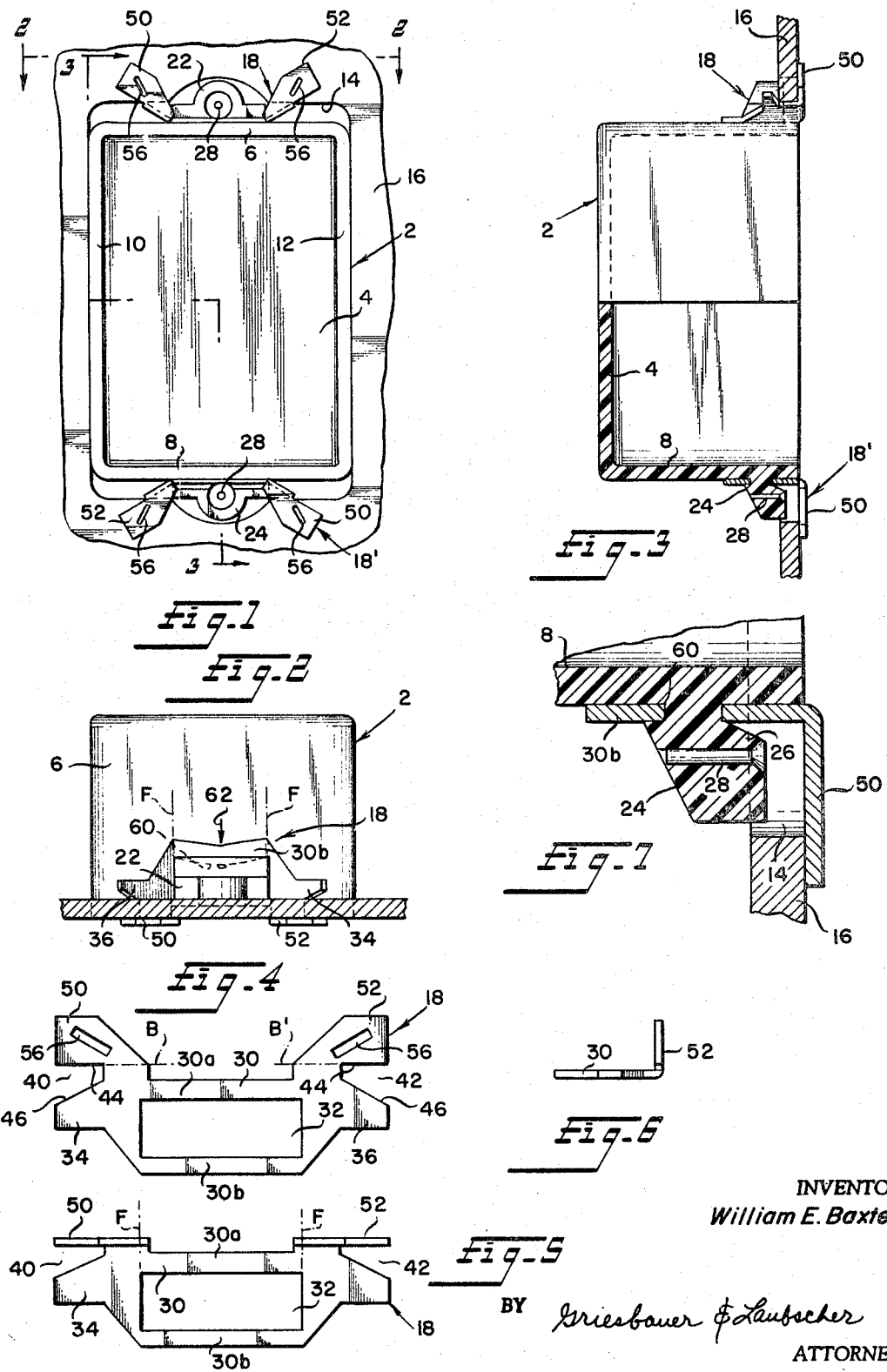

ABSTRACT OF THE DISCLOSURE

This invention relates to the mounting of electrical boxes in wall panels by the use of a pair of deformable brackets made of sheet material. Each bracket is provided with attaching means to secure the bracket to the electrical box and panel engaging members adapted to be positioned so that they engage the wall panel to secure the electrical box in the desired position. Tool receiving openings are provided on each of the panel engaging members to facilitate the bending of the members so that they engage the wall panel.

In the prior art, various means have been proposed for securing an electrical box in a wall opening. For example, in the Grenier Patent No. 3,061,258, a relay mounting bracket is disclosed having tongue means that are twistable by pliers to secure the relay housing in place. Similarly, in the Wilder Patent No. 2,451,267, a metal mounting spider is disclosed having lugs that are bendable to lock an electrical box in position.

Owing to their relative complexity, the prior boxes are rather expensive to manufacture and difficult to assemble. Furthermore, it is often a problem to effect a sufficiently rigid mounting of the box in the wall opening, particularly when the installer is working in close quarters and has limited access to the opening. In the case of boxes molded from a suitable insulating material, such as a synthetic plastic material, it is difficult to rigidly secure the mounting means to the box without cracking or otherwise damaging the same. The present invention was developed to avoid the above and other drawbacks of the known electrical box mounting means and to provide a mounting ear arrangement that not only permits ready connection of deformable mounting ear means to the box but also affords the positive mounting of the box in a panel opening by the use of a standard twisting tool, such as a screwdriver, from the forward side of the panel.

The primary object of the present invention is to provide mounting ear means adapted for attachment to the side walls of an electrical box and including wing portions that are outwardly deformable to engage the forward and rear surfaces of the panel adjacent the opening. In the preferred form of the invention, the box is provided with integral lugs that extend outwardly from the side walls. The mounting ear means, which are normally punched from a deformable metal sheet, include a base portion containing an aperture for receiving a lug, said lug having an overhanging lip portion for at least partially maintaining the mounting ear in place. At each end of the base portion, the mounting ear includes wing portions that are bendable outwardly into engagement with the walls of the panel opening, said wing portions carrying opposed surfaces that engage the forward and rear surfaces of the panel.

In accordance with a more specific object of the invention, the base portion of the mounting ear means includes a deformable section that is adapted to be laterally displaced into a corresponding locking recess contained in the box mounting lug, whereby the base portion of the ear is rigidly secured to the box. This recess is contained on the rear wall of the lug, and the projecting lip portion, beneath which the base portion of the mounting ear extends, projects forwardly from the front wall of the lug.

A further object of the present invention is to provide mounting ear means that are operable solely from the front of the wall opening by the use of a conventional twisting tool, such as a screwdriver. To this end, the wing portions carry at their forward edges orthogonally arranged flanges that extend parallel with the forward surface of the panel, each of said flanges containing a slot for receiving the tool.

Other objects and advantages of the invention will become apparent from a study of the following specification when considered in conjunction with the accompanying drawing, in which:

FIG. 1 is a front elevational view illustrating the manner in which an electrical box is mounted in a wall opening by the mounting ear means of the present invention;

FIGS. 2 and 3 are sectional views taken along lines 2—2 and 3—3, respectively, of FIG. 1;

FIG. 4 is a plan view of the mounting ear blank as initially punched from a metal sheet;

FIGS. 5 and 6 are plan and side elevation views, respectively, of the mounting ear; and FIG. 7 is a detailed sectional view illustrating the manner in which an ear is mounted upon a lug of the box.

Referring first to FIGS. 1–3, the rectangular open-topped electrical box 2 is molded of synthetic plastic material and includes a bottom wall 4 and opposed pairs of side walls 6 and 8, and 10 and 12, respectively. The box is mounted in a corresponding rectangular opening 14 contained in a panel 16 of rigid material (for example, plywood) by means of deformable mounting ears 18 and 18' that are secured to external lugs 22 and 24 integral with side walls 6 and 8, respectively. Each lug has in horizontal cross-section adjacent the corresponding side wall a generally rectangular configuration, and at its upper forward edge an overhanging lip portion 26 (FIG. 7). The lugs contain horizontal threaded bores 28 that receive screws by means of which a conventional electrical device (for example, a switch or a receptacle, not shown) is secured in the box.

Referring to FIGS. 4–6, each mounting ear is punched from a deformable metal sheet and initially has the form of the blank shown in FIG. 4. The central or base portion 30 of the blank contains an aperture 32 the dimensions of which correspond with the dimensions of the cross-section of the lugs adjacent the side walls. At each end the blank includes wing portions 34, 36 containing notches 40, 42 having opposed divergent walls 44, 46. At their forward edges, the wings carry flanges 50, 52 that are initially bent upwardly about fold lines B, B' (FIG. 4) to positions normal to the base portion 30 as shown in FIGS. 5 and 6. The flanges contain slots 56 for receiving a wing-bending tool (for example, a screwdriver) as will be described below.

To mount an ear 18 upon a lug, the forward part 30a of the base portion 30 is placed beneath the lip 26 and the ear is pivoted downwardly so that the lug extends through aperture 32 and the base portion 30 is in surface-to-surface contact with the adjacent side wall surface. The rear wall of the lug contains a locking recess 60 (FIGS. 2 and 7) adapted to receive the central part of base portion 30b when deformed in its plane by the application of a force (by a screwdriver and hammer, for example) in the direction shown by the arrow 62 (FIG. 2).

Assuming that the ears 18, 18' are thus fastened upon the lugs 22 and 24, respectively, the box is inserted rearwardly into the panel opening 14 until the notches 40, 42 are opposite the panel 16. A suitable wing-bending tool (such as a small screwdriver) is inserted into a slot 56, and the tool is turned about its axis to bend the wing about the fold line F (FIGS. 2 and 5) until the opposed spaced surfaces on the wing portion (namely, the rear flange surface and the inclined rear notch surface) engage the forward and rear surfaces of the panel 16 adjacent the opening 14 as shown in FIGS. 3 and 5. By appropriate location of the flange fold lines B, B' (FIG. 4), the rear surfaces of flanges 50 and 52 are caused to be in surface-to-surface contact with the forward surface of panel 16 when the wings are bent to secure the box in place in the wall opening as shown in FIGS. 1, 3 and 7.

While in arcordance with the patent statutes the preferred form and embodiment of the invention has been illustrated and described, it will be apparent to those skilled in the art that various changes and modifications may be made in the apparatus described without deviating from the invention set forth in the following claims.

What is claimed is:

1. Mounting ear means for mounting in a panel opening an open-topped electrical box having side and bottom walls, comprising
   a unitary plate of deformable material including a base portion adapted for rigid mounting upon the outer surface of a side wall of the box, and at least one wing portion connected at one end with said base portion, said wing portion carrying a pair of opposed spaced surfaces the spacing distance of which corresponds generally with the panel thickness, said wing portion being bendable, when the box is arranged in the panel opening, outwardly toward a box retaining position in which said wing portion is angularly arranged relative to said base portion and said opposed surfaces engage the forward and rear surfaces, respectively, of said panel adjacent said opening, said wing portion carrying at its forward edge an orthogonally arranged flange portion containing a tool-receiving aperture by means of which said wing portion is bent to said box-retaining position.

2. Apparatus as defined in claim 1 wherein said plate includes a second wing portion connected at one end with said base portion, said second wing portion also carrying a pair of opposed surfaces and being bendable to an angular box-retaining position relative to said base portion in which the opposed surfaces of said second wing portion engage the forward and rear surfaces of said panel adjacent said opening at a location spaced from the opposed surfaces of said first wing portion.

3. Apparatus as defined in claim 2 wherein said wing portions are bendable about fold lines generally normal to the bottom wall of the electrical box.

4. Apparatus as defined in claim 1 wherein said wing portion contains at its forward edge a notch one wall of which defines one of said opposed surfaces; the rear surface of said flange portion defining the other of said opposed surfaces.

5. Apparatus as defined in claim 4, wherein said opposed surfaces are arranged at an acute angle relative to each other.

6. Mounting ear means as defined in claim 2, wherein said base portion contains an aperture for receiving lug means integral with the side wall of the box, whereby said ear is mounted on the box.

7. Electrical box means adapted for mounting in a panel opening the configuration of which corresponds generally with that of the cross-section of the box, comprising
   an open-topped electrical box molded from insulating material and including bottom and side walls, said box containing on opposed external surfaces of said side walls a pair of mounting lugs;
   a pair of mounting ears mounted on said lugs, each of said mounting ears including a base portion containing an opening receiving said lug, said base portion being in contact with the wall surface of the box adjacent said lug, said base plate including a wing portion bendable, when the box is mounted in the opening, from a first position generally coplanar with said base portion to a second position angularly arranged relative to said base portion, said wing portion carrying opposed surfaces for engaging, when in the second position, forward and rear surfaces of said panel adjacent said openings;
   each of said lugs including a lip portion extending at least partially over the corresponding base portion to maintain the same in engagement with the said wall.

8. Electrical box means as defined in claim 7, wherein each lug contains on the side thereof opposite said lip a recess adjacent the connection of the lug with the body for receiving a laterally deformed coplanar part of the base portion of the plate.

9. Electrical box means as defined in claim 7, wherein said wing portion includes actuating means arranged forwardly of said panel for bending said wing portion from the first position to the second position.

10. Apparatus as defined in claim 9 wherein said actuating means comprises a flange carried by the forward edge of and normal to said wing portion, said flange containing a tool-receiving slot.

11. Apparatus as defined in claim 7, wherein said opposed surfaces carried by said wing portion are inclined at an acute angle relative to each other, whereby the position of engagement of the panel by said opposed surfaces is a function of the panel thickness.

References Cited

UNITED STATES PATENTS

| 1,246,107 | 11/1917 | Kendig | 220—3.5 |
| 2,491,742 | 12/1949 | Lein. | |
| 2,777,893 | 1/1957 | De Rosso | 174—52 |

ROY D. FRAZIER, *Primary Examiner.*

J. F. FOSS, *Assistant Examiner.*